United States Patent [19]

Dynie

[11] 4,450,672
[45] May 29, 1984

[54] PULLEY MOUNTING MEANS FOR POWER LAWN RAKE

[75] Inventor: Ernest R. Dynie, Brockville, Canada

[73] Assignee: Black & Decker Inc., Newark, Del.

[21] Appl. No.: 416,148

[22] Filed: Sep. 9, 1982

[51] Int. Cl.³ .................... A01D 7/00; A01D 69/00
[52] U.S. Cl. ................................ 56/16.7; 56/16.4
[58] Field of Search ............ 56/16.7, 16.4; 403/355

[56] References Cited

U.S. PATENT DOCUMENTS

| | | | |
|---|---|---|---|
| 2,146,519 | 2/1939 | Zimmerman | 403/355 |
| 2,269,429 | 1/1942 | Brenkert | 403/355 |
| 2,648,557 | 8/1953 | Stewart, Sr. | 403/355 |
| 2,755,037 | 7/1956 | Sarath | 403/355 |
| 3,022,073 | 2/1962 | Miller | 403/355 |
| 3,031,018 | 4/1962 | Smithers | 172/41 |
| 3,178,955 | 4/1965 | Enders et al. | 74/369 |
| 3,342,273 | 9/1967 | Crane | 403/355 X |
| 3,396,593 | 8/1968 | Moores, Jr. | 74/371 |
| 4,344,273 | 8/1982 | Jobling et al. | 56/16.7 |

*Primary Examiner*—Paul J. Hirsch
*Attorney, Agent, or Firm*—R. B. Sherer; H. Weinstein; Charles E. Yocum

[57] ABSTRACT

An improved mounting means is provided for the driven pulley of a power lawn rake. The driven pulley has a through axial bore. The rotor shaft is received in the bore and extends therethrough. A central tubular hub is formed on the inner face of the driven pulley and has a pair of diametrically-opposed openings formed therein. A transverse pin is carried by the rotor shaft and has radially-projecting end portions received in the openings in the hub, thereby keying the driven pulley to the rotor shaft. A self-locking retaining ring is received over the extending portion of the rotor shaft and resiliently bears against the outer face of the driven pulley, thereby retaining the pulley on the rotor shaft.

9 Claims, 4 Drawing Figures

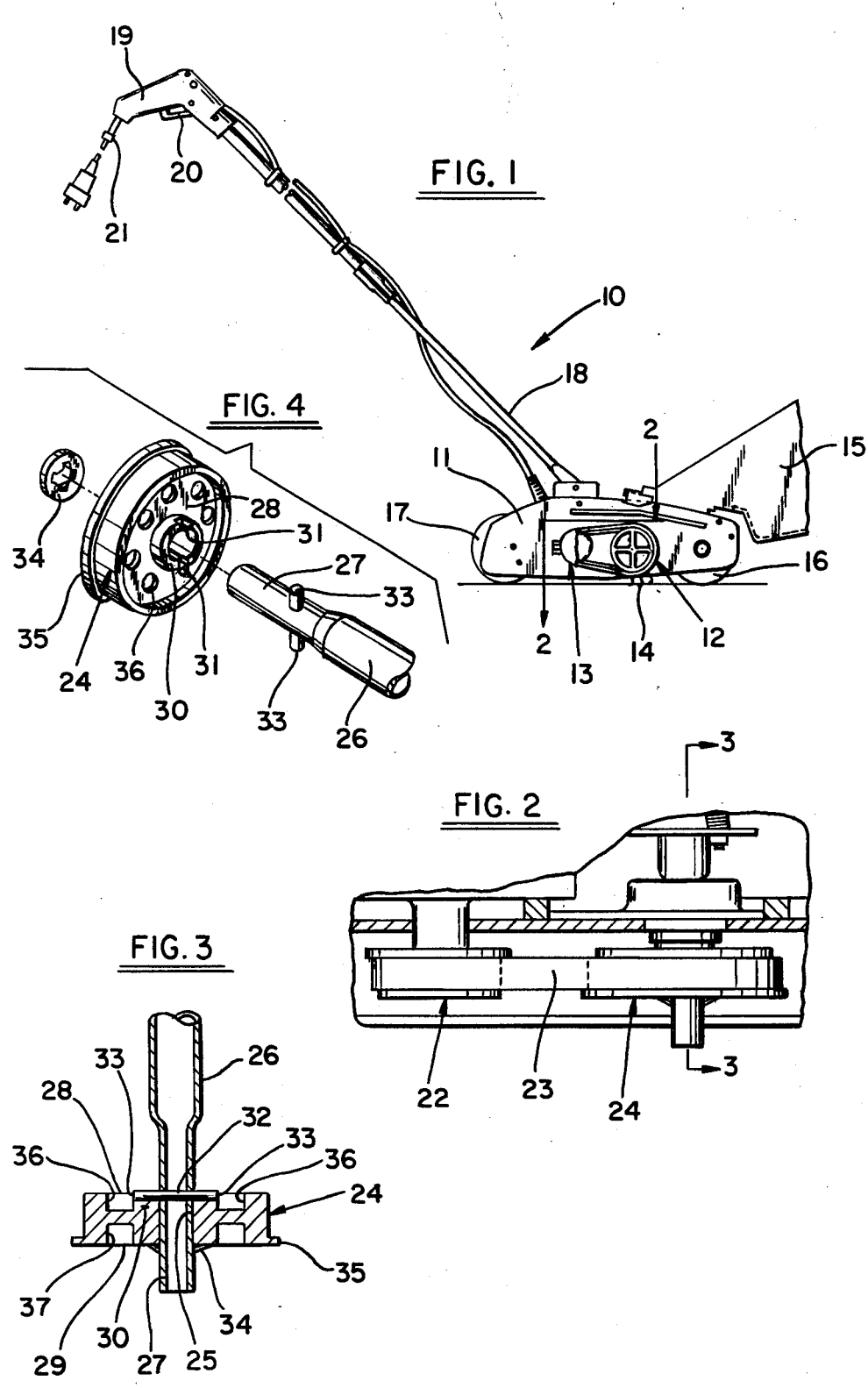

PULLEY MOUNTING MEANS FOR POWER LAWN RAKE

FIELD OF THE INVENTION

The present invention relates to a pulley mounting means for a power tool, and more particularly, to an improved means for mounting the driven pulley on the rotor shaft of a power lawn rake.

BACKGROUND OF THE INVENTION

A power lawn rake is well known in the prior art. One example is described and claimed in the co-pending application Ser. No. 408,483, filed Aug. 16, 1982 for a "Power Lawn Rake" and assigned to the assignee of the present invention. In this co-pending application, the power lawn rake generally comprises a frame including a pair of side housings, a deflector box mounted therebetween, a rotor having a rotor shaft journaled in the side housings forwardly of the deflector box, a plurality of ground-engaging spring fingers or tines positioned on the rotor shaft, the tines being arranged in a helical formation along the axis of the shaft, a removable plastic bin forwardly of the rotor for receiving the dead leaves, grass clippings and other debris picked up by the tines on the rotor, respective forward and rearward wheel means on the frame, and a suitable handle for guiding the power rake over the lawn.

Moreover, in the aforesaid pending application, the driving means for the rotor comprises an electric motor cantilever mounted on one of the side housings, a gear case forwardly of the motor, gearing in the gear case connecting the motor shaft to an output spindle journaled in the one housing, a driving pulley on the spindle, a driven pulley on the rotor shaft, and a belt connecting the driving and driven pulleys.

SUMMARY OF THE PRESENT INVENTION

It is an object of the present invention to provide an improved means for mounting the driven pulley on the rotor shaft of a power lawn rake of the type described.

It is another object of the present invention to provide a mounting means which is easy to assemble, economical, and reliable in its performance.

In accordance with the teachings of the present invention, the driven pulley of the power lawn rake has a through axial bore formed therein. The rotor shaft is received in the bore and has a portion extending therethrough. A keying means is provided between the rotor shaft and the inner face of the driven pulley. A self-locking retaining ring is carried by the extending portion of the rotor shaft and bears against the outer face of the driven pulley.

In accordance with the further teachings of the present invention, the keying means comprises a central tubular hub formed on the inner face of the driven pulley. The hub has a pair of diametrically-opposed openings formed therein. A transverse pin is carried by the rotor shaft and has radially-projecting end portions received in the respective openings in the hub.

In accordance with the still further teachings of the present invention, the rotor shaft is tubular, the retaining ring exerts a resilient bias against the driven pulley, and the driven pulley comprises a plastic molded article without side-pulls.

These and other objects of the present invention will become apparent from a reading of the following specification, taken in conjunction with the enclosed drawings.

BRIEF DESCRIPTION OF THE DRAWINGS

FIG. 1 is a side elevation of a power lawn rake incorporating the teachings of the present invention;

FIG. 2 is a stepped section view, taken along the line 2—2 of FIG. 1, and showing the driving means between the output spindle and the rotor shaft;

FIG. 3 is a section view, taken along the lines 3—3 of FIG. 2, showing the driven pulley mounting means of the present invention; and FIG. 4 is an exploded perspective of the mounting means of the present invention, showing the rotor shaft, driven pulley, and retaining ring.

DESCRIPTION OF THE PREFERRED EMBODIMENT

With reference to FIG. 1, there is illustrated a power lawn rake 10 with which the teachings of the present invention may find more particular utility. It will be appreciated by those skilled in the art, however, that the teachings of the present invention are equally applicable to other wheeled tools for lawn and garden usage, such as lawn mowers, as well as other power tools having similar design and environmental parameters associated therewith. With this in mind, the power lawn rake 10 generally comprises a main frame having a pair of side housings, one of which is shown at 11, a rotor 12 journaled in the frame and driven by a motor 13, the rotor having a plurality of ground-engaging spring fingers or tines, some of which are shown at 14, a bin 15 removably mounted on the frame for receiving the leaves, grass clippings and other debris picked up by the tines on the rotor, forward wheel means 16, rearward wheel means 17, an elongated wand-type handle 18 mounted on the frame, a hand grip 19 on the end of the handle, a switch having a trigger 20 mounted in the hand grip, and a suitable line cord 21 for energizing the motor.

With reference to FIG. 2, the motor is arranged to drive a driving pulley 22. The means for driving the pulley 22 includes suitable gearing (in a gear case mounted on the motor housing). The gearing is conventional and hence has been omitted for ease of illustration. The driving pulley 22 is connected by a belt 23 to a driven pulley 24. The belt may comprise a timing belt, a vee-belt, or a flat belt, as desired.

With reference to FIGS. 3 and 4, the teachings of the present invention, and the advantages and benefits thereof, will become more readily apparent. The driven pulley 24 has a through axial bore 25. The rotor shaft 26, which is preferably tubular, is received in the bore and has a portion 27 extending therethrough. The driven pulley has an inner face 28 and an outer face 29. A central tubular boss or hub 30 is formed on the inner face and has a pair of diametrically-opposed openings 31. A transverse pin 32 is carried by the rotor shaft and has radially-projecting end potions 33 received in the openings in the hub, thereby keying the driven pulley to the rotor shaft for conjoint rotation. A self-locking retaining ring 34 is slipped over the extending portion of the rotor shaft and bears against the outer face of the driven pulley. As is apparent from the structure of the retaining ring seen in FIG. 4, internal teeth are formed therein to provide a biting engagement with the portion of the rotor shaft extending through the axial bore in the driven pulley. The retaining ring is thus carried by the rotor shaft, exerts a resilient bias against the outer face of the driven pulley, and maintains the pulley on the rotor shaft. Preferably, the pulley comprises a molded plastic article without side-pulls. An annular flange 35 is formed on the driven pulley for maintaining the belt, and a plurality of pockets 36 and 37 are formed in the respective inner and outer faces of the driven pulley for weight reduction purposes.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In a power lawn rake having a housing provided with a motor-driven shaft journaled therein, a driving pulley on the shaft, a rotor having a rotor shaft journaled in the housing, a driven pulley on the rotor shaft and having inner and outer faces, and a belt connecting the driving and driven pulleys, the improvement in means for mounting the driven pulley on the rotor shaft, which comprises: the driven pulley having a through axial bore formed therein, the rotor shaft being received in the bore and having a portion extending therethrough, keying means between the rotor shaft and the inner face of the driven pulley, and a self-locking retaining ring carried by the extending portion of the rotor shaft and bearing against the outer face of the driven pulley for exerting a resilient bias thereagainst to cooperate with said keying means in retaining said driven pulley on said rotor shaft.

2. The improvement of claim 1, wherein the keying means comprises a central tubular hub formed on the inner face of the driven pulley, the hub having a pair of diametrically-opposed openings formed therein, and a transverse pin carried by the rotor shaft and having radially-projecting end portions received in the respective openings in the hub.

3. The improvement of claim 1, wherein the rotor shaft is tubular.

4. The improvement of claim 1, wherein the driven pulley comprises a plastic molded article without side-pulls.

5. The improvement of claim 1, wherein the retaining ring exerts a resilient bias against the driven pulley.

6. In a power lawn rake having a housing provided with a motor-driven shaft journaled therein, a driving pulley on the shaft, a rotor having a rotor shaft journaled in the housing, a driven pulley on the rotor shaft and having inner and outer faces, and a belt connecting the driving and driven pulleys, the improvement in means for mounting the driven pulley on the rotor shaft, which comprises: the driven pulley having a through axial bore formed therein, the rotor shaft being received in the bore and having a portion extending therethrough, a central tubular hub formed on the inner face of the driven pulley, the hub having a pair of diametrically-opposed openings formed therein, a transverse pin means, carried by the rotor shaft and having radially-projecting end portions received in the respective openings in the hub, for keying the driven pulley to the rotor shaft, and a self-locking retaining ring means bearing against the outer face of the driven pulley for exerting a resilient bias thereagainst to retain said transverse pin means end portions in said openings in the hub, said self-locking retaining ring means carried by the extending portion of the rotor shaft.

7. In a power lawn rake having a housing provided with a motor-driven shaft journaled therein, a driving pulley on the shaft, a rotor having a rotor shaft journaled in the housing, a driven pulley on the rotor shaft and having inner and outer faces, and a belt connecting the driving and driven pulleys, the improvement in means for mounting the driven pulley on the rotor shaft, which comprises: the driven pulley having a through axial bore formed therein, the rotor shaft received in the bore and having a portion extending therethrough, a central tubular hub formed on the inner face of the driven pulley, the hub having a pair of diametrically-opposed openings formed therein, a transverse pin carried by the rotor shaft and having radially-projecting end portions received in the respective openings in the hub, thereby keying the driven pulley to the rotor shaft, the driven pulley comprising a plastic molded article without side pulls, and resilient means carried by the extending portion of the rotor shaft and bearing against the outer face of the driven pulley for retaining the driven pulley on the rotor shaft in keyed engagement therewith.

8. In a power operated tool, the combination of a pulley having an inner face and an outer face, the pulley being formed as a molded plastic article without side pulls, the pulley having a through axial bore formed therein, a hollow shaft received in the bore and having a portion extending therethrough, the inner face of the pulley having a central tubular hub provided with a pair of diametrically-opposed openings formed therein, a transverse pin carried by the shaft and having radially-extending end portions received in the respective openings, thereby keying the pulley to the shaft, and a self-locking retaining ring slipped over the extending portion of the shaft, the ring bearing against the outer face of the pulley and exerting a resilient bias thereagainst to retain said end portions of said transverse pin in said openings formed in said hub thereby to retain said pulley in a keyed engagement with said rotor shaft.

9. The improvement of claim 2 wherein said self-locking retaining ring includes biting means for bitingly engaging said portion of said rotor shaft extending through said bore in said driven pulley thereby to maintain engagement between said end portions of said transverse pin and said openings formed in said hub, whereby said driven pulley and said rotor shaft are keyed to one another.

* * * * *